United States Patent [19]
Collette et al.

[11] Patent Number: 4,910,054
[45] Date of Patent: Mar. 20, 1990

[54] PLASTIC PREFORM HAVING REINFORCED CONTAINER BASE FORMING PORTION AND CONTAINER FORMED THEREFROM

[75] Inventors: Wayne N. Collette, Merrimack; Suppayan M. Krishnakumar, Nashua, both of N.H.

[73] Assignee: Continental PET Technologies, Inc., Norwalk, Conn.

[21] Appl. No.: 278,462

[22] Filed: Dec. 1, 1988

[51] Int. Cl.⁴ .............................................. B65D 23/00
[52] U.S. Cl. .................................. 428/35.7; 215/1 C; 215/12.1; 428/212; 428/542.8
[58] Field of Search ............... 428/35.7, 36.7, 542.8, 428/212; 215/1 C, 12.1

[56] References Cited
U.S. PATENT DOCUMENTS
4,535,901 8/1985 Okudaira et al. ................... 428/36.7

FOREIGN PATENT DOCUMENTS
5577532 6/1980 Japan.

Primary Examiner—James Seidleck
Attorney, Agent, or Firm—Charles E. Brown; Paul Shapiro; Charles A. Brown

[57] ABSTRACT

A blown plastic container of a type normally blown from a single resin preform, such as PET, wherein the bases of a three layer construction with at least one layer either being PET having a high IV or a resin which has a high Tg. The secondary resin may either be in the form of a core layer injected into the base of the injection molded preform or in the form of initially injected inner and outer base layers. By utilizing a small amount of the second resin, greater strength can be obtained together with a greater resistance to cracking at higher temperatures as well as the reduction in the overall weight of the resultant container.

11 Claims, 1 Drawing Sheet

PLASTIC PREFORM HAVING REINFORCED CONTAINER BASE FORMING PORTION AND CONTAINER FORMED THEREFROM

This invention relates in general to new and useful improvements in blow molded plastic containers, and more particularly to improved preforms having a reinforced container base forming portion.

In the formation of blow molded plastic containers, most particularly polyester resin containers, a preform is injection molded and thereafter internally pressurized within a blow mold with the result that the resin of the preform stretches both axially and in the hoop direction in the forming of the container. There are, however, two portions of the preform which are not materially expanded. The first is the neck finish portion of the preform which is not presented to the blow mold and is not expanded. The other is the container base forming portion of the preform, most particularly the central portion thereof which for all practical purposes remains in its amorphous unoriented state. Because this portion of the preform remains in its amorphous state, it does not have the benefit of being strengthened by biaxial orientation.

Although the base configuration of the resultant blow molded container may vary in configuration depending upon the particular container and application, since the central part of the base portion remains in its amorphous unoriented state but at the same time is stressed when the container is filled with a product under pressure, such as a carbonated liquid, two commercial problems may result (1) the low strength amorphous region may deform outwardly (i.e. creep) under pressure (especially at elevated temperatures) and (2) stress cracks may occur in the amorphous central portion of the resultant container if it is exposed to environmental stress crack inducing agents (line lubricants, plastic wash chemicals, high moisture storage conditions etc.).

In accordance with this invention, it is proposed to reinforce the preform in the container base forming portion by forming the preform of a multiple layer construction of which at least one layer is formed of a resin having greater strength via increased modules (or stiffness) or higher temperature softening resistance (or Tg) than the resin which forms the major portion of the preform.

It is known to injection mold preforms utilizing more than one resin. Such an injection molding process is disclosed, for example, in the Krishnakumar et al, U.S. Pat. No. 4,609,516 granted Sept. 2, 1986. This patent illustrates in FIG. 16 a typical blow molded bottle having an amorphous neck finish 136 and a bottom 132 with a center of a much greater thickness than the body 130, which center is in an amorphous state.

This invention is also applicable to other container base configurations including a base configuration which is concaved and which is reinforced by ribs which are integrally molded in the interior of the base forming portion of the preform as is disclosed in the patent to Krishnakumar et al U.S. Pat. No. 4,334,627 granted June 15, 1982.

The invention may be utilized in conjunction with a refillable polyester beverage bottle as disclosed in the patent to Collette U.S. Pat. No. 4,755,404 granted July 5, 1988.

Most particularly, the improved preform base construction may be beneficially utilized in conjunction with the forming of a base portion of a container which is provided with a plurality of feet as is disclosed in the patent to Adomaitis et al, U.S. Pat. No. 3,598,270 granted Aug. 10, 1971.

With the above and other objects in view that will hereinafter appear, the nature of the invention will be more clearly understood by reference to the following detailed description, the appended claims, and the several views illustrated in the accompanying drawings.

Figure 1:
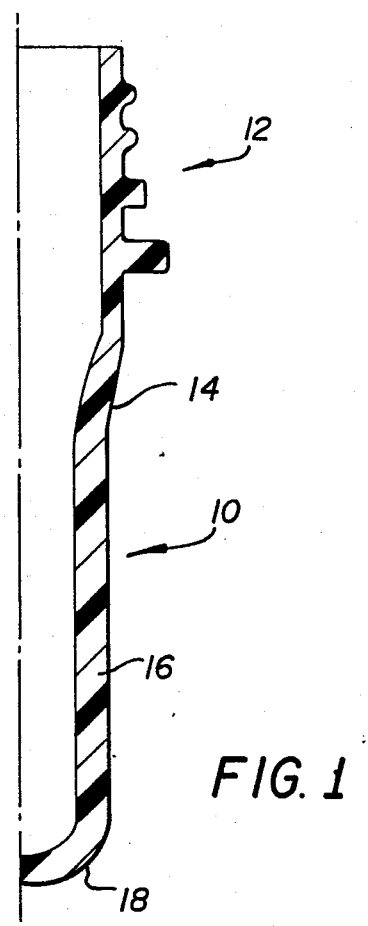
FIG. 1 is a half sectional view taken through a typical preform of a construction in accordance with this invention.

Referring now to the drawings in detail, reference is first made to FIG. 1 wherein there is illustrated a conventional injection molded plastic preform generally identified by the numeral 10. The preform 10 per se is of a conventional configuration and includes an upper portion in the form of a neck finish 12 particularly configurated for receiving a screw threaded closure. Below the neck finish 12, the preform 10 includes a tapered shoulder forming portion 14. The principal part of the preform 10 is in the form of a body forming portion 16 which terminates at its lower end in a closed container base forming portion 18. This invention in particular relates to an improvement of the base forming portion 18.

It is to be understood that the preform 10 is conventionally formed by injecting flowable resin into a cavity between a core and an injection mold (not shown) at the bottom of the preform.

The construction of the preform 10 is modified by forming the container base forming portion 18 so as to be of a three layer construction including an inner layer 20, an outer layer 22 and a core 24.

Figure 2:
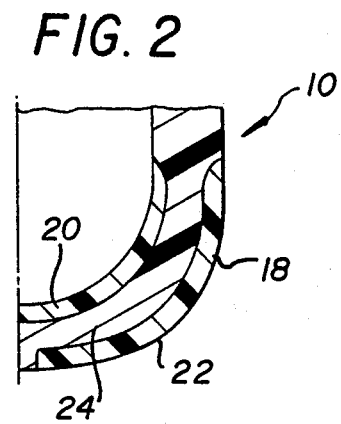
FIG. 2 is an enlarged fragmentary half sectional view of the container base forming portion only of the preform and shows the base forming portion of a three layer construction with the principal material of the preform forming a core layer.

In the embodiment of FIG. 2, and generally in accordance with the teaching of Krishnakumar et al U.S. Pat. No. 4,609,516, a predetermined volume of a first resin is injected into the injection mold cavity followed by the filling of the mold cavity with the principal resin. The second injected resin flows through the first injected resin so as to divide the first injected resin into the layers 20, 22 and to fill the mold cavity so that the preform 10 is primarily formed of the second injected resin which also forms the core 24.

It is to be specifically understood that the resins are different and that the resin which forms the layers 20, 22 has greater strength characteristics than the resin from which the preform 10 is normally formed.

At the present, the preforms 10 are conventionally formed of a polyester resin with the preferred resin being Polyethylene Terephythalate (PET).

Preforms are conventionally formed of PET having a IV of 0.70-0.76 whereas in accordance with this invention the layers 20, 22 are formed of a polyester resin with an IV on the order of 0.80-0.86, which resin is more expensive than the normally used resin, but provides much greater strength. Typically, at the present, both resins may be PET.

To make the record clear, it is pointed out here that IV stands for intrinsic viscosity and is a measure of molecular weight (i.e. total length) of the PET polymer chain. Higher IV resins exhibit an increased resistance to crack initiation and propagation and thus a container base portion having a layer of this higher IV resin substantially eliminates the stress crack problem of present one-piece containers.

PET resin manufacturers control the IV of the resin through a solid stating process which is time dependent. Higher IV's require longer resident times vs. lower IV's and as such are inherently more costly to produce. A price per pound differential of approximately 5% exists for 0.72 IV vs. 0.84 IV PET.

Figure 4:
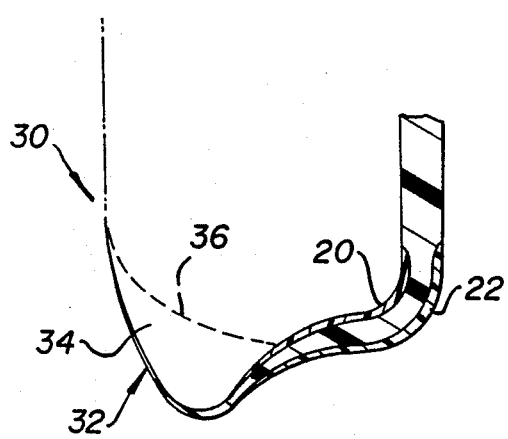
FIG. 4 is a schematic vertical sectional view taken through the base portion of a blow molded container and shows in part the cross section of the preform and in part the cross section of the container utilizing the preform of FIG. 2.
Figure 5:
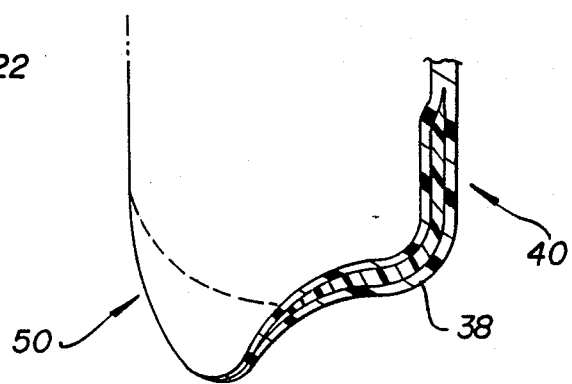
FIG. 5 is a schematic vertical sectional view similar to FIG. 4 utilizing the preform of FIG. 3.

Referring now to FIG. 4, it will be seen that when the preform of FIGS. 1 and 2 is blow molded to form a container base of the type disclosed in the Adomaitis et al patent, the thickness of the container base at the center will be the same as that of the preform 10 at the center. The thickness of the container base will gradually decrease radially outwardly as is clear from the drawing of FIG. 4. It is also to be understood that as the thickness of the material of the base of the container decreases, the orientation increases with only generally the center portion of the container base remaining amorphous and unoriented.

Although the container of FIG. 4, which is identified by the numeral 30, is not fully illustrated, it is to be understood that the upper end thereof will have a neck finish which corresponds to the neck finish 12 and otherwise will be generally of the configuration similar to that illustrated in the Adomaitis et al patent. The container 30 will also include a base portion generally identified by the numeral 32, which base portion is in the form of a plurality of circumferentially spaced legs 34 which are separated by generally hemispherical base portions 36.

While utilizing a resin having a higher IV than the normally used resin does provide the desired structural strength increase, in certain instances, particularly when the container is utilized for a hot fill, it may be desirable to form the layers 20, 22 of a polyester resin having a higher glass temperature (Tg). High Tg copolyesters are preferred due to their melt solubility and resulting adhesion to PET. Non-polyesters such as acrylonitrile styrene, styrene acrylonitrile coplymers, polycarbonate, etc. could also be utilized.

The resultant blown container provides improved thermal stability (i.e. resistance to distortion under pressure at elevated temperatures) vs. monolayer PET containers. This improved thermal stability, in turn, can be utilized to extend the container performance range or (1) permit an increase in the maximum possible base diameter at the same performance level or (2) permit an overall reduction of the base segment wall thickness (with advantages in the area of injection cycle and/or material consumption).

Specific improvements by base type are as follows:

Adomaitis et al type base—½ to 4 liter

Higher carbonation levels in the form of an increase from four volumes maximum to five or six volumes.

Lower base thermal distortion (creep) resulting in reduced tendency towards environmental stress cracking.

Light weight potential of 5 ±2% for the total container weight.

Provides hot fill capability with the fill temperature increasing from a current 160° F. maximum up to 180°-200° F.

Standard base of type shown in Collette U.S. Pat. No. 4,755,404

Improved thermal stability increasing from 180°-190° F. up to 200°±10° F.

Reduced base weight with no loss of thermal performance (up to 10% total weight reduction).

Acceptable thermal stability at larger container diameter (up from 4.5 inch diameter to 6.5 inch diameter).

Rib reinforced base of Krishnakumar et al U.S. Pat. No. 4,334,627

Higher carbonization levels upgrom 4.0 to 5 or 6 volumes.

Larger container diameter increasing from 2.0 inches up to 4 inches.

Lighter weight in the form of decrease of 10% of total container weight.

Improved impact resistance to base section.

Improved impact resistance to base section crack failure when using non-melt soluble high Tg polymers due to inability of crack to propagate across the PET/non-PET interface.

Base construction for refillable container as disclosed in Collette U.S. Pat. No. 4,755,404

Larger container diameters increasing from 2.5 inch up to 3.5 inch.

A reduction in overall weight up to 10%.

Improved resistance to caustic cracking due to reduced base creep during periods of internal pressurization.

Although the invention has been specifically described with respect to the preform 10 of FIG. 2 and the resultant blown container 30 of FIG. 4, other preform base and container arrangements may be utilized. At this time it is most specifically pointed out that the base of the container 30 of FIG. 4 is generally in accordance with the Adomaitis et al patent.

Figure 3:
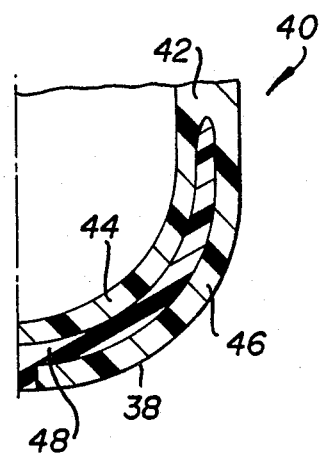
FIG. 3 is another enlarged fragmentary sectional view similar to FIG. 2 and shows the container base forming portion of the preform wherein the container base forming portion is also of a three layer construction but wherein the core layer is formed by a material different from the principal resin.

Reference is now made to FIG. 3 wherein it will be seen that there is illustrated a base 38 of a modified preform 40. The preform 40, except for the base configuration, will be the same as that of the preform 10. In accordance with FIG. 3, a preselected quantity of a first polyester is injected into the preform injection mold to substantially fill the mold. Then the injection mold is completely filled by the injection of a second plastic material which may be in the form of a highter IV PET or a high Tg resin. The first material is identified by the numeral 42 and forms all of the preform 40 except for the base 38 thereof. The first material 42 also defines inner and outer layers 44, 46 which are separated by the second material in the form of a core layer 48.

The preform 40 of FIG. 3, when blown, forms a container 50 having a base configuration shown in half section similar to that of the Adomaitis et al patent. The view also illustrates in half section the base portion 38 of the preform 40.

Although only two specific multiple layer base constructions have been specifically illustrated and described herein, it is to be understood that minor variations may be made in the base construction of both the preform and the resultant container without departing from the spirit and scope of the invention as defined by the appended claims.

We claim:

1. An injection molded plastic preform for the blow molding of a container, said preform including a neck finish portion, a body forming portion and a base forming portion, said neck finish portion and said body forming portion being formed of a single layer and at least part of said base forming portion being formed of three layers, said three layers including inner and outer layers and a core, said inner and outer layers being formed of the same first material, and said core being separately injected and formed of a second and different material, and said single layer portions being formed of the same material as that from which a selective one of said inner and outer layers and core is formed.

2. A plastic preform according to claim 1 wherein one of said materials has materially different characteristics from the other of said materials.

3. A plastic preform according to claim 2 wherein said materials are both of the same resin.

4. A plastic preform according to claim 2 wherein said materials are both formed of the same resin with said one material having a higher intrinsic viscosity than the other.

5. A plastic preform according to claim 2 wherein said one of said materials has a higher Tg than the other.

6. A plastic preform according to claim 2 wherein said one of said materials forms said core, and the other of said materials forms said single layer neck finish and body forming portions and said inner and outer layers.

7. A plastic preform according to claim 2 wherein said one of said materials forms said inner and outer layers, and the other of said materials forms and single layer neck finish and body forming portions and said core.

8. A plastic preform according to claim 3 wherein said one material forms said core, and the other of said material forms said single layer neck finish and body forming portions and said inner and outer layers.

9. A plastic preform according to claim 3 wherein said one of said materials forms said inner and outer layers, and the other of said materials forms said single layer neck finish and body forming portions and said core.

10. A blow molded plastic container formed from the preform of claim 1.

11. A blow molded plastic container according to claim 10 wherein said container has a multiple leg base.

* * * * *